United States Patent
Wang et al.

(10) Patent No.: US 9,843,908 B2
(45) Date of Patent: Dec. 12, 2017

(54) METHOD, CLIENT, SERVER AND SYSTEM FOR INTELLIGENT RECOGNIZING CONTENTS OF SHORT MESSAGE

(71) Applicants: Qing Wang, Shenzhen (CN); Haoran Guo, Shenzhen (CN); Quanhao Xiao, Shenzhen (CN); Yixia Yuan, Shenzhen (CN); Jiashun Song, Shenzhen (CN); Pengtao Li, Shenzhen (CN); Xunchang Zhan, Shenzhen (CN); Chunyou Lin, Shenzhen (CN)

(72) Inventors: Qing Wang, Shenzhen (CN); Haoran Guo, Shenzhen (CN); Quanhao Xiao, Shenzhen (CN); Yixia Yuan, Shenzhen (CN); Jiashun Song, Shenzhen (CN); Pengtao Li, Shenzhen (CN); Xunchang Zhan, Shenzhen (CN); Chunyou Lin, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 36 days.

(21) Appl. No.: 14/535,229

(22) Filed: Nov. 6, 2014

(65) Prior Publication Data
US 2015/0065183 A1   Mar. 5, 2015

Related U.S. Application Data

(63) Continuation of application No. PCT/CN2013/074062, filed on Apr. 11, 2013.

(30) Foreign Application Priority Data
May 9, 2012   (CN) .......................... 2012 1 0142217

(51) Int. Cl.
*H04W 4/00*   (2009.01)
*H04W 4/14*   (2009.01)
(Continued)

(52) U.S. Cl.
CPC ............. *H04W 4/14* (2013.01); *H04W 12/04* (2013.01); *H04W 12/10* (2013.01); *H04L 63/123* (2013.01)

(58) Field of Classification Search
CPC .. H04L 63/123; H04L 12/5895; H04W 12/04; H04W 12/10; H04W 4/14; H04W 4/12; H04M 1/72552
(Continued)

(56) References Cited

U.S. PATENT DOCUMENTS

| | | | |
|---|---|---|---|
| 7,492,949 B1 | 2/2009 | Jamieson | |
| 8,346,223 B1 * | 1/2013 | Byrnes | H04L 29/04 370/486 |

(Continued)

FOREIGN PATENT DOCUMENTS

| | | |
|---|---|---|
| CN | 101022591 | 8/2007 |
| CN | 101807273 | 8/2010 |

(Continued)

OTHER PUBLICATIONS

International Search Report for International Application No. PCT/CN2013/074062, dated Jun. 27, 2013.
(Continued)

*Primary Examiner* — Keith Fang
*Assistant Examiner* — B. M. M Hannan
(74) *Attorney, Agent, or Firm* — Harness, Dickey & Pierce, P.L.C.

(57) ABSTRACT

A method, a client device, a server and a system for intelligent recognizing contents of short message are provided. The method includes the following steps: sending a
(Continued)

short message verification request from a client device to a provider's server, to request a verification authenticity of information read by an application; receiving a short message fed back by the provider's server according to the short message verification request; recognizing the fed back short message and extracting key information thereof according to a pre-set message analysis template, and automatic entering the key information to the application.

4 Claims, 6 Drawing Sheets

(51) Int. Cl.
  *H04W 12/10* (2009.01)
  *H04W 12/04* (2009.01)
  *H04L 29/06* (2006.01)
(58) Field of Classification Search
  USPC ............. 455/466, 410, 411, 412.1, 412.2; 713/170, 171, 169, 152; 726/1, 36; 379/189
  See application file for complete search history.

(56) References Cited

U.S. PATENT DOCUMENTS

| | | | |
|---|---|---|---|
| 8,694,032 B1* | 4/2014 | Kilpatrick | H04W 4/12 370/312 |
| 9,031,586 B1* | 5/2015 | Kilpatrick | H04W 4/18 455/466 |
| 9,430,520 B2* | 8/2016 | Dove | G06F 17/30731 |
| 2003/0182576 A1* | 9/2003 | Morlang | H04L 63/0428 713/171 |
| 2004/0233893 A1* | 11/2004 | Zhou | H04L 63/0838 370/352 |
| 2005/0132202 A1* | 6/2005 | Dillaway | H04L 9/0825 713/179 |
| 2006/0058048 A1* | 3/2006 | Kapoor | G06Q 30/02 455/466 |
| 2006/0078160 A1* | 4/2006 | Fujita | G06F 17/3089 382/100 |
| 2007/0067625 A1* | 3/2007 | Jiang | H04L 63/10 713/168 |
| 2007/0249375 A1* | 10/2007 | Zapata | H04W 12/02 455/466 |
| 2007/0259678 A1* | 11/2007 | Kuk | H04M 1/72525 455/466 |
| 2009/0119754 A1 | 5/2009 | Schubert | |
| 2009/0280842 A1* | 11/2009 | Traasdahl | G06F 17/30864 455/466 |
| 2009/0282467 A1* | 11/2009 | Schenk | H04L 63/10 726/7 |
| 2009/0325609 A1* | 12/2009 | Rosen | H04L 51/34 455/466 |
| 2010/0112997 A1* | 5/2010 | Roundtree | H04L 41/0816 455/420 |
| 2010/0261489 A1* | 10/2010 | Almdovar Herraiz | H04L 12/583 455/466 |
| 2011/0065426 A1 | 3/2011 | Bae et al. | |
| 2011/0119750 A1* | 5/2011 | Lu | H04L 63/00 726/12 |
| 2011/0239160 A1 | 9/2011 | Kirshenboim et al. | |
| 2012/0059891 A1* | 3/2012 | Wen | H04W 4/003 709/206 |
| 2012/0094700 A1* | 4/2012 | Karmarkar | G06F 3/013 455/466 |
| 2012/0117176 A1* | 5/2012 | Luo | H04W 4/14 709/206 |
| 2013/0012248 A1* | 1/2013 | Adams | H04L 12/5855 455/466 |

FOREIGN PATENT DOCUMENTS

| | | |
|---|---|---|
| CN | 101867893 | 10/2010 |
| CN | 102148769 | 8/2011 |
| CN | 202035047 | 11/2011 |
| EP | 19655941 | 9/2008 |
| EP | 2442594 | 4/2012 |
| EP | 2 525 5941 | 11/2012 |
| WO | WO-2007/148969 | 12/2007 |
| WO | WO-2011127555 | 10/2011 |

OTHER PUBLICATIONS

Extended European Search Report for European Patent Application No. 13788191.8, dated May 13, 2015.
First Office Action for Chinese Patent Application No. 201210142217.7, dated Jan. 19, 2015.
International Preliminary Report on Patentability for International Application No. PCT/CN2013/074062, dated Nov. 11, 2014.
Examination Report for European Patent Application No. 13788191.8, dated Jun. 27, 2016, 8 pages.

* cited by examiner

METHOD, CLIENT, SERVER AND SYSTEM FOR INTELLIGENT RECOGNIZING CONTENTS OF SHORT MESSAGE

CROSS-REFERENCE TO RELATED APPLICATIONS

This application is a continuation of International Application No. PCT/CN2013/074062, filed Apr. 11, 2013, entitled "METHOD, CLIENT, SERVER AND SYSTEM FOR INTELLIGENT RECOGNIZING CONTENTS OF SHORT MESSAGE," and claims priority of Chinese Patent Application No. 201210142217.7, filed May 9, 2012, the entire contents of both of which are incorporated herein by reference.

FIELD OF THE INVENTION

The present invention relates to communication technology field, and more particularly to a method, a client, a server and a system for intelligent recognizing contents of short message.

BACKGROUND OF THE INVENTION

Generally, when an application in a phone is started, a short message verification request will be sent to a server of the application or other devices, or a short message will be sent to get some information. The short message verification or information required by the short message is returned to user's phone in the form of a short message fed back by the server of the application or other devices. When users receive the fed back short message, the users browse the content of the short message and enter key information into the application to complete the verification or the corresponding operation.

However, a client of the application in the user's phone cannot automatically get the short message fed back by the server of the application or other devices. In addition, the key information in the fed back short message can only rely on manually recognition, and the key information can only be manually entered into the application. Obviously, tedious manual operation steps do not help to improve the efficiency of information feedback.

SUMMARY OF THE INVENTION

The embodiments of the present invention provide an intelligent recognition method for contents of short messages, can automatically recognition contents of short messages and enhance the efficiency of information feedback.

The present invention provides an embodiment of an intelligent recognition method for contents of short message, the method includes: sending a short message verification request from a client to a provider's server, to request a verification authenticity of information read by an application; receiving a short message fed back by the provider's server according to the short message verification request; recognizing the short message and extracting key information according to a pre-set message analysis template, and automatic entering the key information to the application.

Preferably, after sending the short message verification request from the client to the provider's server, the method further includes: starting to detect a port of the provider's server.

Preferably, the recognizing the short message according to the pre-set message analysis template includes: searching the pre-set message analysis template in a terminal of the client; if the pre-set message analysis template in a terminal of the client, recognizing the fed back short message according to the pre-set message analysis template in the terminal of the client; otherwise, sending the fed back short message from the client to a specified server; receiving a message analysis template matching the short message sending from the specified server; and recognizing the short message according to the message analysis template sending from the specified server.

Preferably, the message analysis template matching the short message is found by the specified server by semantic analysis.

The present invention also provides an embodiment of a client for intelligent recognizing contents of short message, the client includes: a verification requesting unit, configured to send a short message verification request to a provider's server, to request a verification authenticity of information read by an application; a short message detecting unit, configured to receive a short message fed back by the provider's server according to the short message verification request; a short message recognizing unit, configured to recognize the fed back short message and extract key information thereof according to a pre-set message analysis template, and automatic enter the key information to the application.

Preferably, the client further includes: a detection starting unit, configured to start to detect a port of the provider's server.

Preferably, the short message recognizing unit includes: a template searching module, configured to search the pre-set message analysis template in a terminal of the client; a first recognizing module, configured to recognize the fed back short message according to the pre-set message analysis template in the terminal of the client; a sending module, configured to send the fed back short message from the client to a specified server, if the pre-set message analysis template is not in a terminal of the client; a receiving module, configured to receive a message analysis template matching the short message sending from the specified server; a second recognizing module, configured to recognize the fed back short message according to the received message analysis template.

The present invention further provides an embodiment of a server for intelligent recognizing contents of short message, the server includes: a message receiving unit, configured to receive a short message send from a client; a template returning unit, configured to return a pre-set message analysis template according to the short message.

Preferably, the server further includes: a template updating unit, configured to consult with the specified device at a certain time interval to get message analysis templates.

Preferably, the server further includes: a template analyzing unit, configured to search the message analysis template matching the short message by semantic analysis.

The present invention further provides an embodiment of a system for intelligent recognizing contents of short message, and the system includes a client and a server.

The client includes a verification requesting unit, a short message detecting unit, and a short message recognizing unit. The verification requesting unit is configured to send a short message verification request from to a provider's server, to request a verification authenticity of information read by an application. The short message detecting unit is configured to receive a short message fed back by the provider's server according to the short message verification request. The short message recognizing unit is configured to recognize the fed back short message and extract key information thereof according to a pre-set message analysis template, and automatic enter the key information to the application.

The server includes a message receiving unit and a template returning unit. The message receiving unit is configured to receive a short message send from a client. The template returning unit is configured to return a pre-set message analysis template according to the short message.

Preferably, the client further includes: a detection starting unit, configured to start to detect a port of the provider's server.

Preferably, the short message recognizing unit includes: a template searching module, configured to search the pre-set message analysis template in a terminal of the client; a first recognizing module, configured to recognize the fed back short message according to the pre-set message analysis template in the terminal of the client; a sending module, configured to send the fed back short message from the client to the a specified server, if the pre-set message analysis template is not in a terminal of the client; a receiving module, configured to receive a message analysis template matching the short message sending from the specified server; a second recognizing module, configured to recognize the fed back short message according to the received message analysis template.

Preferably, the server further includes: a template updating unit, configured to consult with the specified device at a certain time interval to get message analysis templates.

Preferably, the server further includes: a template analyzing unit, configured to search the message analysis template matching the short message by semantic analysis.

In the present invention, the application client detects the short message sent from a specified device, extracts key information of the short message and automatically enters the key information to the application. The efficiency of information feedback is enhanced by automatically recognition contents of short messages.

DETAILED DESCRIPTION OF PREFERRED EMBODIMENTS

To make the objective, the technical solutions and advantages of the present invention more apparently, embodiments of the present invention will be described in detail accompanying with figures as follows. It should be understood that the specific embodiments described herein is only to explain the present invention, not used to limit the present invention.

Figure 1:
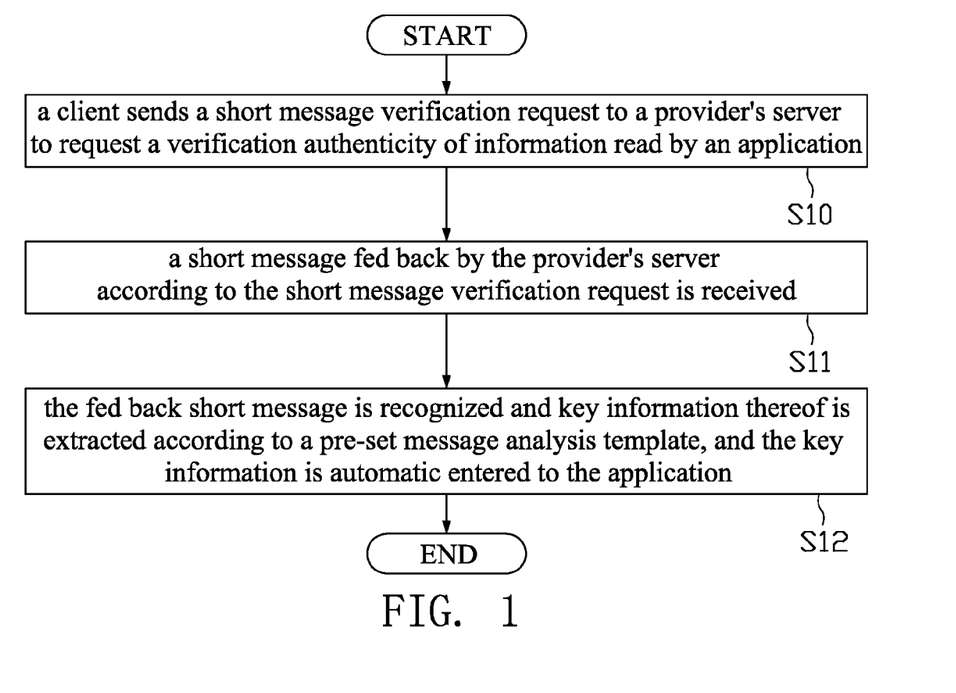
FIG. 1 is a flow chart of an intelligent recognition method for contents of short messages provided by one embodiment of the present invention.

Referring to FIG. 1, FIG. 1 shows a flow chart of a method for intelligent recognizing contents of short message in one embodiment of the present invention, the method includes following steps:

In step 10, a client sends a short message verification request to a provider's server to request a verification authenticity of information read by an application.

In step 11, a short message fed back by the provider's server according to the short message verification request is received.

In step 12, the fed back short message is recognized and key information thereof is extracted according to a pre-set message analysis template, and the key information is automatic entered to the application.

In the embodiment of the present invention, the client can be an application client. The client can be set in smart devices, such as mobile terminals, personal computers, and so on. When the client starts a function, the client will send a short message verification request to a specified device to request a verification authenticity of information read by an application, thereby allowing the client has the function of recognizing of contents of short messages. By detecting the short message fed back by the specified device, extracting the key information of the fed back short message, and entering the key information into the application, the client has the function of automatic entry of information to enhance efficiency and accuracy of information entry, thus the user experience is improved.

The mobile terminals mentioned above can be portable smart devices, such as handheld computers, smart phones and tablet PCs. The short message mentioned above includes system short messages (such as mobile phone text messages, etc.) and/or traffic messages (such as network instant messaging, news, etc.). The specified device mentioned above can be a server corresponding to the client, or other device can provide verification or information to the client. The key information mentioned above can be the information needed to be entered, such as verification information.

Figure 2:
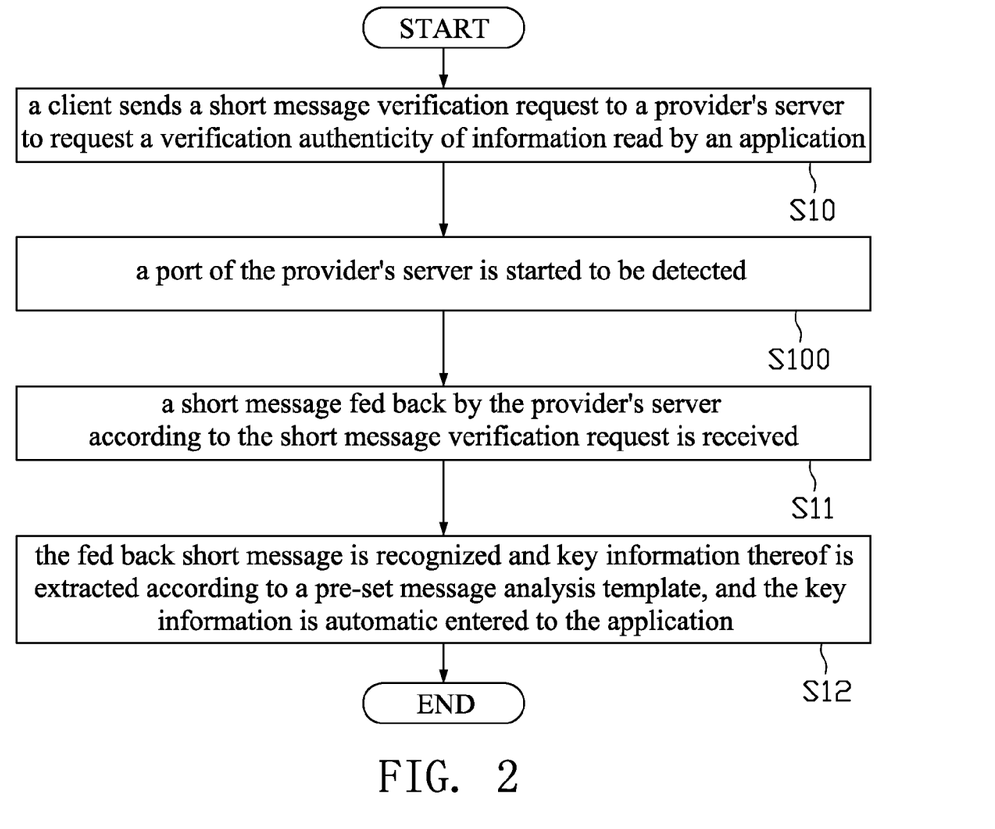
FIG. 2 is a flow chart of an intelligent recognition method for contents of short messages provided by another embodiment of the present invention.

Referring to FIG. 2, FIG. 2 shows a flow chart of a method for intelligent recognizing contents of short message in another embodiment of the present invention. In the another embodiment, after the step 10 in the embodiment mentioned above, the method further includes following steps:

In step 100, a port of the provider's server is started to be detected.

If the client is an application client, the client can receive instruction or set of smart devices. The client also can send a short message to a specified device and get the verification information or the information needed to be provided. At the same time of sending the short message, the client can start a detection of a short message fed back by the specified device.

Alternatively, the smart device sends a short message to the specified device, and triggers the client to start the detection of the short message fed back by the specified device.

The detection of the fed back short message by the client can be implemented by port detection or detection of the short message content, etc.

Figure 3:
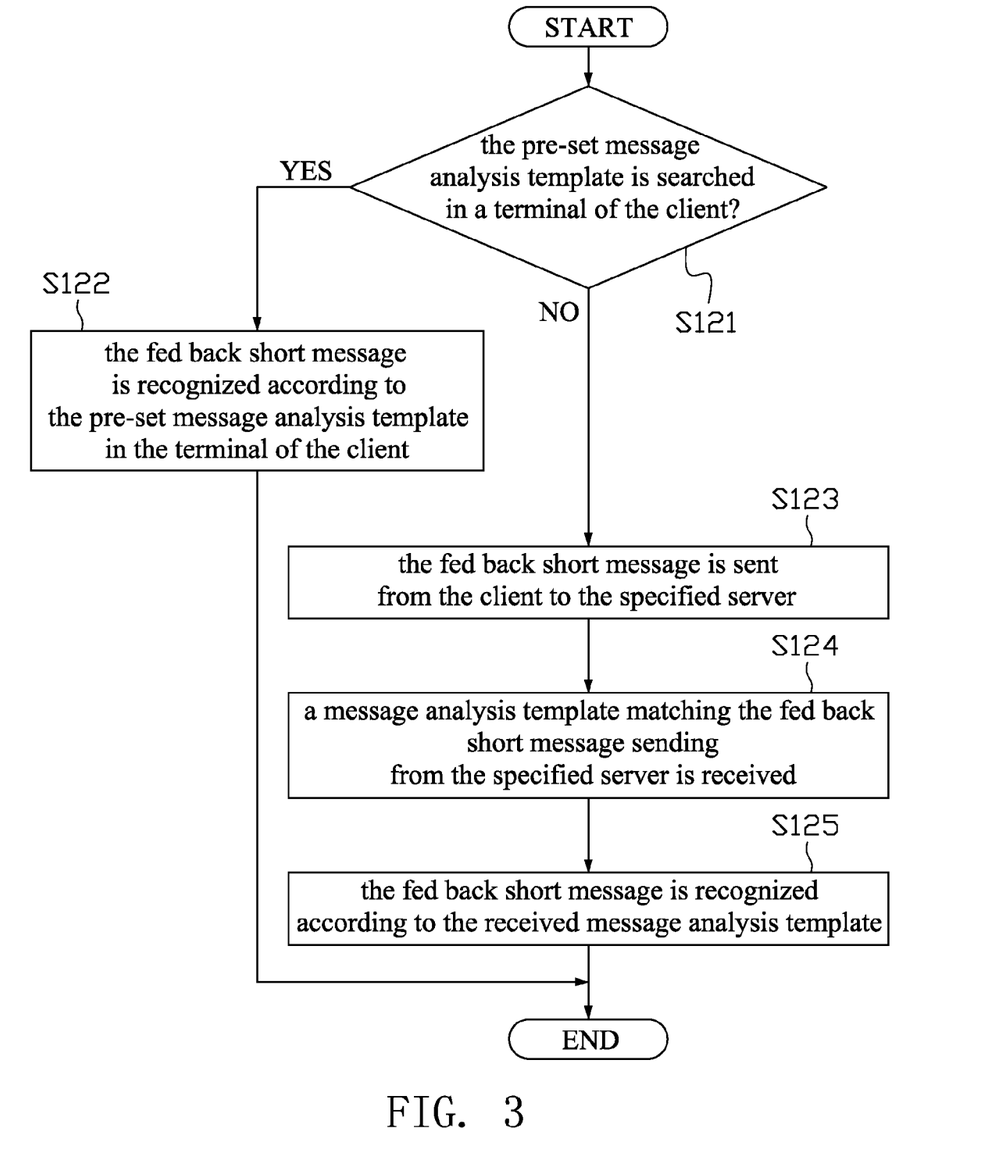
FIG. 3 is a flow chart of an intelligent recognition method for contents of short messages provided by another one embodiment of the present invention.

Referring to FIG. 3, FIG. 3 shows a flow chart of a method for intelligent recognizing contents of short message in another one embodiment of the present invention. Referring to FIG. 3, in the another one embodiment of the present invention, the step 12 includes following steps:

In step 121, the pre-set message analysis template is searched in a terminal of the client. If the pre-set message analysis is in the terminal of the client, step 122 is preceded; otherwise, step 123 to step 125 are preceded.

In step 122, the fed back short message is recognized according to the pre-set message analysis template in the terminal of the client.

In step 123, the fed back short message is sent from the client to the specified server.

In step 124, a message analysis template matching the fed back short message sending from the specified server is received.

In step 125, the fed back short message is recognized according to the received message analysis template.

When the short message fed back by the specified device is detected by the client, the message can be sent to a server corresponding to the client. A template database saving a plurality of pre-set message analysis templates is set in the server. The plurality of pre-set message analysis templates can be obtained by the server through consultation with the specified device. The server can consult with the specified device at a certain time interval to get message analysis templates and update the template database with the message analysis templates. The message analysis template may include definition of the short message transmission format. The message analysis template can provide the specific information of the corresponding short message as well as location of the specific information. Therefore, the key information of the short message can be accurately obtained.

If the server detects the templates in the database do not have a message analysis template corresponding to the short message, the server can confirm message analysis template of the short message. The message analysis template can be confirmed by semantic analysis and content matching, etc. The confirmation can be completed by the server common with the specified device. After being confirmed, the confirmed message analysis template can be added to the template database, to assist the client to recognize the short message.

The server can take a message analysis template from the template database according to a short message sent by the client, and return the message analysis template to the client.

After the message analysis template returned by the server being received by the client, the client can recognize the short message by the message analysis template, extract key information from the short message, and enter the key information to the application automatically. The client can save the message analysis template for use next time for recognizing of the same type short message.

In alternative embodiments, in the case of the condition of the client allowed, the template database can also be set in the client. The retrieval of message analysis template, the recognition of short message recognition, and information extraction and entry can be done on the client.

In following context, the intelligent recognition method is further described by assuming the application in the smart phone is a traffic monitor application.

The traffic monitor application (client) set in the smart phone can receive instruction or set of traffic acquisition, and send a short message to an operator of the smart phone to query the real-time traffic flow of the smart phone. At the same time, the traffic monitor application can start a detection of a short message fed back by the smart phone's operator. When the short message fed back by the specified device is detected by the traffic monitor application, the short message can by recognized according to the message analysis template. The message analysis template can be a template saved in the traffic monitor application or a template saved in a server. After the short message being recognized by the traffic monitor application, the traffic monitor application can extract the traffic flow information (key information) in the short message and display the traffic flow information on the client for browsing.

Figure 4:
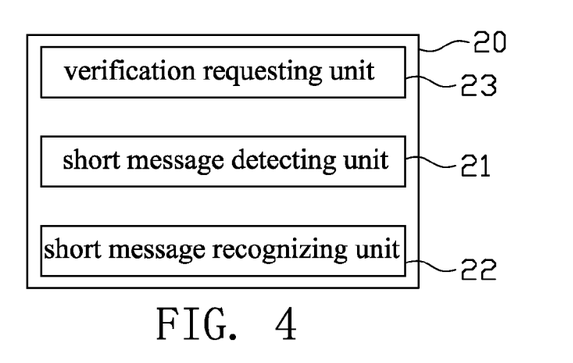
FIG. 4 is a schematic diagram of a client for intelligent recognizing contents of short messages provided by one embodiment of the present invention.

Referring to FIG. 4, FIG. 4 is a schematic diagram of a client for intelligent recognizing contents of short messages provided by one embodiment of the present invention. In this embodiment, the client 20 includes a verification requesting unit 23, a short message detecting unit 21, and a short message recognizing unit 22. The verification requesting unit 23 is configured to send a short message verification request from to a provider's server, to request a verification authenticity of information read by an application. The short message detecting unit 21 is configured to receive a short message fed back by the provider's server according to the short message verification request. The short message recognizing unit 22 is configured to recognize the fed back short message and extract key information thereof according to a pre-set message analysis template, and automatic enter the key information to the application.

In the embodiment of the present invention, the client 20 can be an application client. The client 20 can be set in smart devices, such as mobile terminals, personal computers, and so on. When the client 20 starts a function, the client will send a short message verification request to a specified device to request a verification authenticity of information read by an application, thereby allowing the client 20 has the function of recognizing of contents of short messages. By detecting the short message fed back by the specified device, extracting the key information of the fed back short message, and entering the key information into the application, the client 20 has the function of automatic entry of information to enhance efficiency and accuracy of information entry, thus the user experience is improved.

The mobile terminals mentioned above can be portable smart devices, such as handheld computers, smart phones and tablet PCs. The short message mentioned above includes system short messages (such as mobile phone text messages, etc.) and/or traffic messages (such as network instant messaging, news, etc.). The specified device mentioned above can be a server corresponding to the client 20, or other device can provide verification or information to the client 20. The key information mentioned above can be the information needed to be entered, such as verification information.

Figure 5:
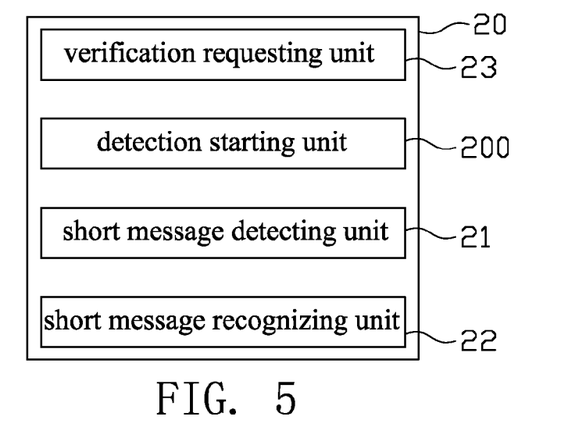
FIG. 5 is a schematic diagram of a client for intelligent recognizing contents of short messages provided by another embodiment of the present invention.

Referring to FIG. 5, FIG. 5 is a schematic diagram of a client for intelligent recognizing contents of short messages provided by another embodiment of the present invention. In this embodiment, the client 20 further includes: a detection starting unit 200, configured to start to detect a port of the provider's server.

If the client 20 is an application client, the client can receive instruction or set of smart devices. The client 20 also can send a short message to a specified device and get the verification information or the information needed to be provided. At the same time of sending the short message, the client can start a detection of a short message fed back by the specified device.

Alternatively, the smart device sends a short message to the specified device, and triggers the client 20 to start the detection of the short message fed back by the specified device.

The detection of the fed back short message by the client 20 can be implemented by port detection or detection of the short message content, etc.

Figure 6:
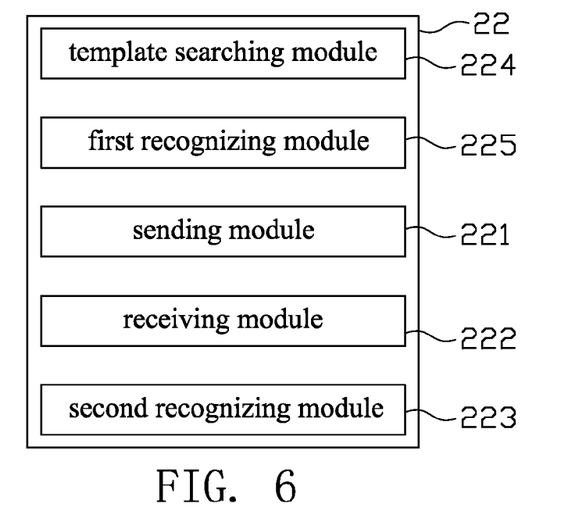
FIG. 6 is a schematic diagram of a client for intelligent recognizing contents of short messages provided by another one embodiment of the present invention.

Referring to FIG. 6, FIG. 6 is a schematic diagram of a client for intelligent recognizing contents of short messages provided by another one embodiment of the present invention. In this embodiment, the short message recognizing unit 22 includes a template searching module 224, a first recognizing module 225, a sending module 221, a receiving module 222 and a second recognizing module 223. The template searching module 224 is configured to search the pre-set message analysis template in a terminal of the client. The first recognizing module 225 is configured to recognize the fed back short message according to the pre-set message analysis template in the terminal of the client. The sending module 221 is configured to send the fed back short message from the client to a specified server, if the pre-set message analysis template is not in a terminal of the client. The receiving module 222 is configured to receive a message analysis template matching the short message sending from the specified server. The second recognizing module 223 is configured to recognize the fed back short message according to the received message analysis template.

When the short message fed back by the specified device is detected by the client 20, the message can be sent to a server corresponding to the client 20. A template database saving a plurality of pre-set message analysis templates is set in the server. The plurality of pre-set message analysis templates can be obtained by the server through consultation with the specified device. The server can consult with the specified device at a certain time interval to get message analysis templates and update the template database with the message analysis templates. The message analysis template may include definition of the short message transmission format. The message analysis template can provide the specific information of the corresponding short message as well as location of the specific information. Therefore, the key information of the short message can be accurately obtained.

If the server detects the templates in the database do not have a message analysis template corresponding to the short message, the server can confirm message analysis template of the short message. The message analysis template can be confirmed by semantic analysis and content matching, etc. The confirmation can be completed by the server common with the specified device. After being confirmed, the confirmed message analysis template can be added to the template database, to assist the client to recognize the short message.

The server can take a message analysis template from the template database according to a short message sent by the client 20, and return the message analysis template to the client 20.

After the message analysis template returned by the server being received by the client, the client 20 can recognize the short message by the message analysis template, extract key information from the short message, and enter the key information to the application automatically. The client 20 can save the message analysis template for use next time for recognizing of the same type short message.

In alternative embodiments, in the case of the condition of the client 20 allowed, the template database can also be set in the client 20. The retrieval of message analysis template, the recognition of short message recognition, and information extraction and entry can be done on the client.

Figure 7:
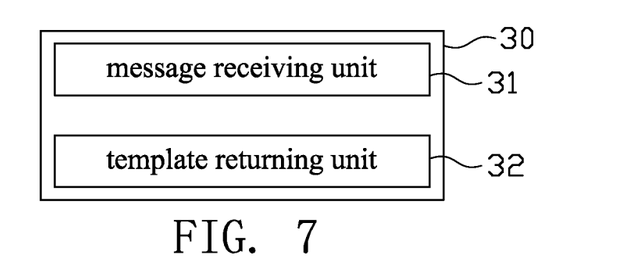
FIG. 7 is a schematic diagram of a server for intelligent recognizing contents of short messages provided by one embodiment of the present invention.

Referring to FIG. 7, FIG. 7 is a schematic diagram of a server for intelligent recognizing contents of short messages provided by one embodiment of the present invention. In this embodiment, the server 30 includes a message receiving unit 31 and a template returning unit 32. The message receiving unit 31 is configured to receive a short message send from a client. The template returning unit 32 is configured to return a pre-set message analysis template according to the short message.

Figure 8:
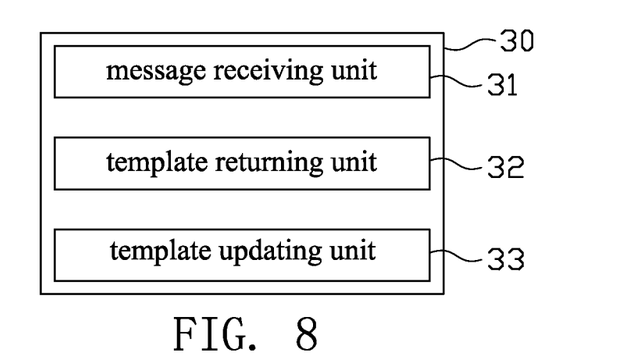
FIG. 8 is a schematic diagram of a server for intelligent recognizing contents of short messages provided by another embodiment of the present invention.

Referring to FIG. 8, FIG. 8 is a schematic diagram of a server for intelligent recognizing contents of short messages provided by another embodiment of the present invention. In this embodiment, the server 30 further includes: a template updating unit 33, configured to consult with the specified device at a certain time interval to get message analysis templates.

When the short message fed back by the specified device is detected by the client 20, the message can be sent to the server 30 corresponding to the client. A template database saving a plurality of pre-set message analysis templates is set in the server 30. The plurality of pre-set message analysis templates can be obtained by the server 30 through consultation with the specified device. The server 30 can consult with the specified device at a certain time interval to get message analysis templates and update the template database with the message analysis templates. The message analysis template may include definition of the short message transmission format. The message analysis template can provide the specific information of the corresponding short message as well as location of the specific information. Therefore, the key information of the short message can be accurately obtained.

Figure 9:
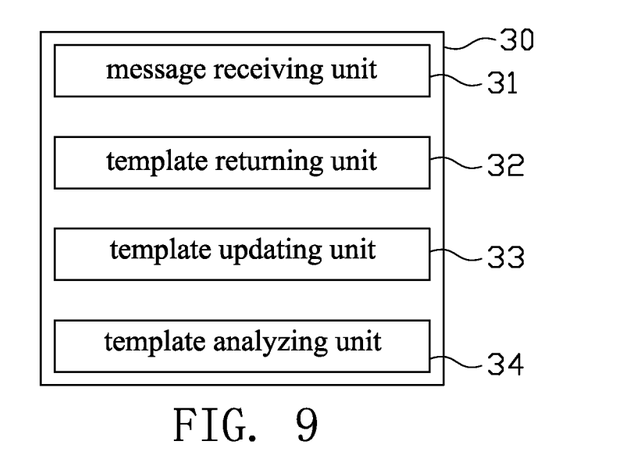
FIG. 9 is a schematic diagram of a server for intelligent recognizing contents of short messages provided by another one embodiment of the present invention.

Referring to FIG. 9, FIG. 9 is a schematic diagram of a server for intelligent recognizing contents of short messages provided by another one embodiment of the present invention. The server 30 further includes: a template analyzing unit 34, configured to search the message analysis template matching the short message by semantic analysis.

If the server 30 detects the templates in the database do not have a message analysis template corresponding to the short message, the server 30 can confirm message analysis template of the short message. The message analysis template can be confirmed by semantic analysis and content matching, etc. The confirmation can be completed by the server 30 common with the specified device. After being confirmed, the confirmed message analysis template can be added to the template database, to assist the client 20 to recognize the short message.

The server 30 can take a message analysis template from the template database according to a short message sent by the client 20, and return the message analysis template to the client 20.

After the message analysis template returned by the server 30 being received by the client 20, the client 20 can recognize the short message by the message analysis template, extract key information from the short message, and enter the key information to the application automatically. The client 20 can save the message analysis template for use next time for recognizing of the same type short message.

Figure 10:
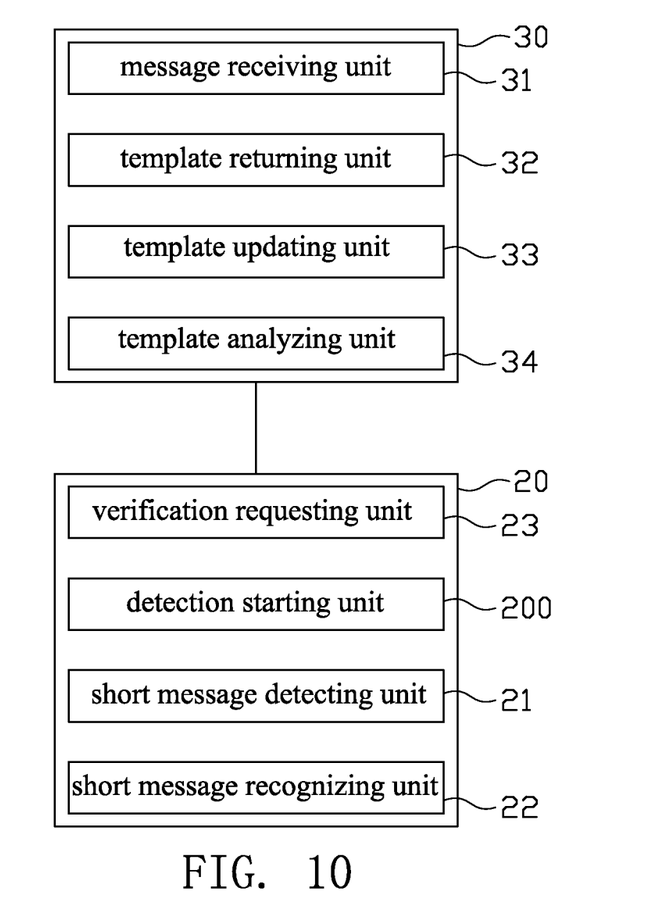
FIG. 10 is a schematic diagram of a system for intelligent recognizing contents of short messages provided by one embodiment of the present invention.

Referring to FIG. 10, FIG. 10 is a schematic diagram of a system for intelligent recognizing contents of short messages provided by one embodiment of the present invention. The system includes a client 20 and a server 30

The client 20 includes a verification requesting unit 23, a short message detecting unit 21, and a short message recognizing unit 22. The verification requesting unit 23 is configured to send a short message verification request from to a provider's server, to request a verification authenticity of information read by an application. The short message detecting unit 21 is configured to receive a short message fed back by the provider's server according to the short message verification request. The short message recognizing unit 22 is configured to recognize the fed back short message and extract key information thereof according to a pre-set message analysis template, and automatic enter the key information to the application.

The short message recognizing unit 22 includes a template searching module 224, a first recognizing module 225, a sending module 221, a receiving module 222 and a second recognizing module 223. The template searching module 224 is configured to search the pre-set message analysis template in a terminal of the client. The first recognizing module 225 is configured to recognize the fed back short message according to the pre-set message analysis template in the terminal of the client. The sending module 221 is configured to send the fed back short message from the client to a specified server, if the pre-set message analysis template is not in a terminal of the client. The receiving module 222 is configured to receive a message analysis template matching the short message sending from the specified server. The second recognizing module 223 is configured to recognize the fed back short message according to the received message analysis template.

The server 30 includes a message receiving unit 31 and a template returning unit 32. The message receiving unit 31 is configured to receive a short message send from a client. The template returning unit 32 is configured to return a pre-set message analysis template according to the short message.

The client 20 and the server 30 can be the client and the server described in the embodiments mentioned above.

It can be understood that all or part of the technique solutions provided by the above embodiments can be achieved by programming, and the program can be stored in a computer readable storing medium such as, hard disk drives, compact disks, or soft disk drives.

The above descriptions are only preferred embodiments of the present invention, and are not intended to limit the present invention. Any amendments, replacement and modification made to the above embodiments under the spirit and principle of the present invention should be included in the scope of the present invention.

What is claimed is:

1. An intelligent recognition method for contents of short message, the method comprising:
    sending a short message verification request from a client to a provider's server, to request a verification authenticity of information read by an application;
    receiving a short message fed back by the provider's server according to the short message verification request;
    recognizing the fed back short message and extracting key information thereof according to a pre-set message analysis template, and automatic entering the key information to the application, wherein the message analysis template comprises definition of the short message transmission format to provide a location of the key information in the short message;
    wherein the recognizing the fed back short message according to the pre-set message analysis template, comprises:
    searching the pre-set message analysis template in a terminal of the client;
    when the pre-set message analysis template is in a terminal of the client, recognizing the fed back short message according to the pre-set message analysis template in the terminal of the client;
    otherwise, sending the fed back short message from the client to a specified server; receiving a message analysis template matching the short message sending from the specified server; and recognizing the short message according to the message analysis template sending from the specified server; wherein the message analysis template matching the short message is found by the specified server by semantic analysis.

2. The method as claimed in claim 1, wherein after sending the short message verification request from the client to the provider's server, further comprises:
    starting to detect a port of the provider's server.

3. A client device for intelligent recognizing contents of short message, the client device comprising:
    a processor for executing instructions stored in a non-transitory machine readable storage medium to execute the following procedure, comprising:
    send a short message verification request from the client device to a provider's server, to request a verification authenticity of information read by an application;
    receive a short message fed back by the provider's server according to the short message verification request;
    recognize the short message and extract key information according to a pre-set message analysis template, and automatic enter the key information to the application, wherein the message analysis template comprises definition of the short message transmission format to provide a location of the key information in the short message;
    the instructions are to execute the following procedure:
    search the pre-set message analysis template in a terminal of the client device;
    recognize the fed back short message when the pre-set message analysis template is in the terminal of the client device;
    send the fed back short message from the client device to a specified server, when the pre-set message analysis template is not in a terminal of the client device;
    receive a message analysis template matching the short message sending from the specified server; wherein the message analysis template matching the short message is found by the specified server by semantic analysis;
    recognize the fed back short message according to the received message analysis template.

4. The client device as claimed in claim 3, wherein the instructions are further to execute the following procedure:
    start to detect a port of the provider's server.

* * * * *